(12) United States Patent
Cressionnie (10) Patent No.: US 11,149,875 B2
(45) Date of Patent: Oct. 19, 2021

(54) LOCK OUT DEVICE FOR AIR ACTUATED VALVES

(71) Applicant: Robert Cressionnie, Rocky Mount, NC (US)

(72) Inventor: Robert Cressionnie, Rocky Mount, NC (US)

( * ) Notice: Subject to any disclaimer, the term of this patent is extended or adjusted under 35 U.S.C. 154(b) by 0 days.

(21) Appl. No.: 17/111,583

(22) Filed: Dec. 4, 2020

(65) Prior Publication Data

US 2021/0180720 A1 Jun. 17, 2021

Related U.S. Application Data

(60) Provisional application No. 62/949,183, filed on Dec. 17, 2019.

(51) Int. Cl.
*F16K 35/06* (2006.01)
*F16K 31/12* (2006.01)

(52) U.S. Cl.
CPC .............. *F16K 35/06* (2013.01); *F16K 31/12* (2013.01)

(58) Field of Classification Search
CPC ...... F16K 35/02; F16K 35/022; F16K 35/025; F16K 35/06; F16K 35/10; F16K 35/12; F16K 35/00; F16K 31/12
USPC ....... 251/89, 89.5, 90, 91, 111, 114; 70/175, 70/176, 177, 178, 179, 180; 138/89, 138/89.1, 89.2, 89.3, 89.4, 90, 96 T; 285/38, 84, 85, 86, 87, 88
See application file for complete search history.

(56) References Cited

U.S. PATENT DOCUMENTS

| | | | | |
|---|---|---|---|---|
| 1,349,522 A | * | 8/1920 | Mannhardt | B60C 29/06 138/89.3 |
| 1,879,482 A | * | 9/1932 | Quintenz | B60K 15/03 70/242 |
| 2,334,424 A | * | 11/1943 | Livermont | F16L 19/04 138/96 T |
| 2,607,370 A | * | 8/1952 | Anderson | F16L 55/136 138/90 |
| 3,391,554 A | * | 7/1968 | Wrenshall | F16K 35/10 70/178 |
| 3,479,005 A | * | 11/1969 | De Graaf | F16L 37/0842 251/149.9 |
| 3,593,549 A | * | 7/1971 | Lakins | G05D 16/0636 70/164 |
| 4,438,779 A | * | 3/1984 | Allread | F16L 37/113 137/614.06 |
| 4,959,980 A | * | 10/1990 | Phillips | B65D 55/14 70/158 |

(Continued)

FOREIGN PATENT DOCUMENTS

GB 1148817 4/1969

*Primary Examiner* — Kevin F Murphy
*Assistant Examiner* — Jonathan J Waddy
(74) *Attorney, Agent, or Firm* — Coats & Bennett, PLLC (57) ABSTRACT

A Lockout Tagout (LOTO) device is configured to positively and securely lock out various types of valves, such as air actuated valves. In particular, the LOTO device serves as a lock block at the air inlet of a valve, thereby preventing the inadvertent connection of an air source to the valve while it is closed. The LOTO device may also be tagged. Thus, when installed, the LOTO device and its accompanying tag serve as both a physical and visual indicator that the valve to which it is attached is out of service and should not be handled, actuated, opened, or tampered with.

24 Claims, 9 Drawing Sheets

(56) References Cited

U.S. PATENT DOCUMENTS

| | | | |
|---|---|---|---|
| 5,199,286 A * | 4/1993 | Jakubas | B65D 39/08 |
| | | | 137/454.5 |
| 5,201,201 A * | 4/1993 | Sylvester | F16K 35/06 |
| | | | 137/382 |
| 5,236,172 A | 8/1993 | Friemoth et al. | |
| 5,299,597 A | 4/1994 | Fort et al. | |
| 5,338,069 A * | 8/1994 | McCarthy | F16L 37/18 |
| | | | 285/312 |
| 5,823,023 A | 10/1998 | Benda | |
| 5,996,613 A | 12/1999 | Bertolotti | |
| 6,041,813 A | 3/2000 | Koch et al. | |
| 6,920,894 B1 | 7/2005 | Nickeas et al. | |
| 7,213,845 B2 * | 5/2007 | Sato | F16L 37/23 |
| | | | 285/315 |
| 8,814,137 B2 * | 8/2014 | Wong | F16K 5/06 |
| | | | 251/149.9 |
| 8,857,790 B2 * | 10/2014 | Wong | F16K 35/10 |
| | | | 251/149.9 |
| 9,995,420 B1 * | 6/2018 | Topacio | F16L 27/04 |
| 2008/0302433 A1 * | 12/2008 | Taskar | F16K 27/003 |
| | | | 137/861 |
| 2011/0180168 A1 * | 7/2011 | Stone | F16L 55/1157 |
| | | | 137/800 |

* cited by examiner

LOCK OUT DEVICE FOR AIR ACTUATED VALVES

RELATED APPLICATIONS

The present application claims benefit of U.S. Provisional Application 62/949,183, which was filed Dec. 17, 2019, the disclosure of which is incorporated herein by reference in its entirety.

TECHNOLOGICAL FIELD

The present disclosure relates generally to the field of lockout devices, and more particularly to Lockout Tagout (LOTO) devices for air actuated valves.

BACKGROUND

Lockout Tagout (LOTO) devices are safety devices used to close off many different kinds of air actuated valves. For example, during maintenance work, LOTO devices help ensure that the valves connected to one or more lines in a system being serviced remain switched off. If a maintenance worker were to open a locked valve while the system is being serviced, even unintentionally, that worker and/or others around him could be very seriously injured.

By way of example only, consider a Clean-In-Place (CIP) procedure for a filling system. As is known in the art, CIP procedures are used to clean the interior surfaces of pipes, vessels, process equipment, filters, fittings, valves, etc., of the system without having to disassemble the system. Known CIP procedures use high heat, high pressure, and caustic chemicals to ensure that the interior surfaces of the system are properly cleaned and sanitized. Therefore, maintenance personnel usually lock the air actuated valves in the system prior to beginning a CIP procedure to ensure safety. If a worker were to inadvertently open a locked valve during the CIP procedure, the worker could be sprayed with hot, caustic chemicals under great pressure.

To help prevent such unfortunate accidents, and to help ensure safe working conditions, the Occupational Safety and Health Administration (OSHA) created standards to which all LOTO devices must adhere. Currently, OSHA standards dictate, inter alia, that LOTO devices (1) must be capable of being locked; (2) must directly prevent activation of the valve once it is locked; and (3) must not be easily removed from the valve once it is locked.

SUMMARY

Aspects of the present disclosure provide a Lockout Tagout (LOTO) device for an air actuated valve. More particularly, the LOTO device of the present disclosure positively and securely locks out air actuated valves. The LOTO device serves as a lock block at the air inlet of a valve, thereby preventing the inadvertent connection of an air source to the valve while it is closed. Additionally, the LOTO device is also tagged. When installed, the LOTO device and its accompanying tag serve as both a physical and visual indicator that the valve to which it is attached is out of service and should not be handled, actuated, opened, or tampered with.

Accordingly, in one embodiment, the present disclosure provides a LOTO device comprising a shaft configured to be connected to a coupler attached to a valve, a cap slidingly engaged with the shaft, and a locking lever pivotably connected to the shaft. The cap is configured to slide over the shaft so as to prevent the shaft from being loosened from the coupler. The locking lever is configured to move between an unlocked position in which the LOTO device can be removed from the coupler, and a locked position that prevents the removal of the LOTO device from the coupler. Additionally, in the locked position, the locking lever is configured to prevent the cap from sliding along the shaft.

Additionally, one embodiment of the present disclosure provides a method of locking out a valve. In this embodiment, the method calls for connecting a shaft of a Lockout Tagout (LOTO) device to a coupler attached to the valve. The method also calls for sliding a cap over a connection between the shaft and the coupler so as to prevent the shaft from being loosened from the coupler. In this aspect, the cap is slidingly engaged with the shaft. The method then calls for rotating a locking lever pivotably connected to the shaft of the LOTO device from an unlocked position in which the LOTO device can be removed from the coupler, to a locked position that prevents the cap from sliding along the shaft and exposing the connection between the shaft and the coupler thereby preventing the removal of the LOTO device from the coupler.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

The LOTO device of the present embodiments is a safety device configured to positively and securely locks out air actuated valves. In particular, the LOTO device described herein provides a physical barrier that prevents a person from opening a valve, as well as a visual indicator that indicates the valve to which the LOTO device is attached is out of service, and therefore, should not be handled, actuated, opened, or otherwise tampered with. As described in more detail below, a LOTO device configured according to the present embodiments meets the requirements set forth by OSHA by inserting a solid rod into a valve at an air connection, securing that rod with a tubing nut, covering the nut to prevent its removal with tools or by hand, and then locking the entire assembly in place using a lockable swing arm that blocks retraction of the nut cover.

The LOTO device of the present disclosure provides benefits that conventional locking devices cannot provide. For example, rather than connect to the valve itself, conventional locking devices, commonly referred to as "scissor-type" locking devices, attach directly to the air line providing air at high pressure to the valve. Although such scissor-type locking devices do lock the air line, they are not structured to lock the valve and it is easy to install them incorrectly. Further, because conventional scissor-type locking devices attach only to the air line itself, they are not capable of preventing an air line connected to a new or alternate air source from being attached to the valve. This is because conventional scissor-type locking devices leave the connection point into the valve unprotected. Additionally, conventional scissor-type locking devices are not structured to prevent their forced removal from an air line, and as such, can be easily damaged and removed. Therefore, there is a heavy reliance on employee training, administrative controls, and policy to control the unauthorized removal of a conventional locking devices.

In contrast, due to its structure and the manner in which it connects to the valve being locked, the LOTO device of the present disclosure meets the intent of the OSHA regulations. Specifically, not only is the LOTO device of the present disclosure difficult to remove once it is installed, but it requires excessive force to accomplish an unauthorized removal. In more detail, the LOTO device of the present disclosure connects to the valve being locked instead of to the air line that provides air to the valve under high pressure. Because the LOTO device of the present embodiments is configured to connect to the valve rather than just the air line, it actively prevents maintenance workers and other personnel from unintentionally connecting a new or alternate air line to the valve while the valve is locked. The LOTO device of the present embodiments also functions as a visual deterrent against the removal of a bonnet or servicing of a locked out valve. And, in situations where conventional scissor-type locking devices are also being used, the LOTO device of the present embodiments eliminates or at the least significantly reduces the negative consequences associated with the installation of a conventional scissor-type locking device. Therefore, a LOTO device configured according to the present disclosure helps keep workers, as well as the systems to which they are connected, safe.

Figure 1:
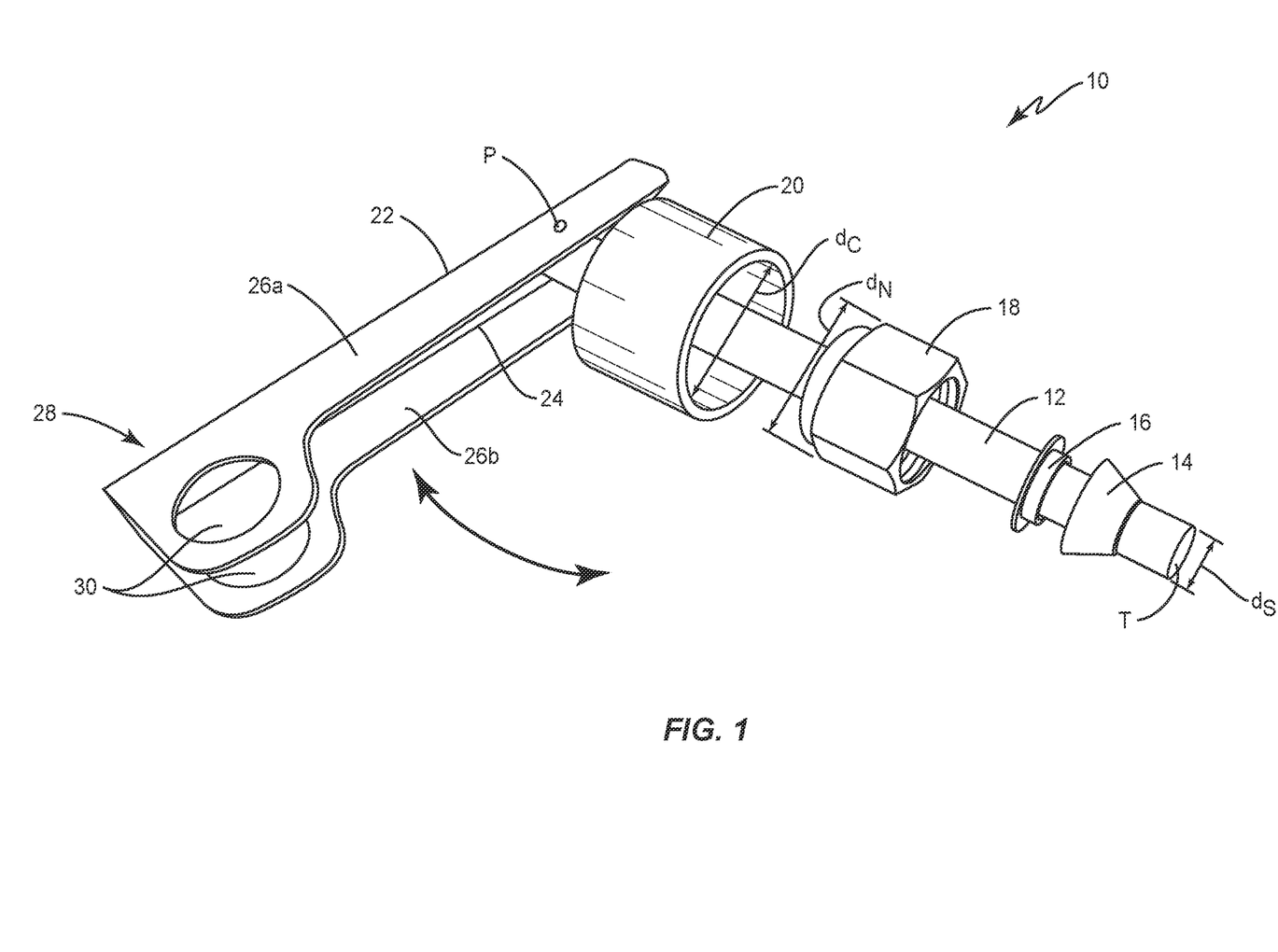
FIG. 1 illustrates a Lockout Tagout (LOTO) device configured according to one embodiment of the present disclosure in an unlocked position.

Turning now to the drawings, FIG. 1 illustrates a LOTO device 10 for an air actuated valve configured according to one embodiment of the present disclosure. As stated above, LOTO device 10 is specifically configured to lock the air actuated valve (seen later in FIG. 3) from being used once the valve has been removed from service. When installed, LOTO device 10 physically prevents someone from opening a valve that is undergoing a maintenance procedure. It also visually indicates that the valve is out of service, and that handling, actuating, opening, or otherwise tampering with the valve can be dangerous and cause severe injury.

As seen in the embodiment of FIG. 1, LOTO device 10 comprises a shaft 12 (sometimes called a "rod"), first and second ferrules 14, 16, a tubing nut 18, a cap 20, and a locking lever 22. The first and second ferrules 14, 16, the tubing nut 18, and the cap 20 slide axially along the shaft 12.

Shaft 12 is a rigid cylindrical tube constructed of a metal or metal alloy. Although the size of the shaft is not germane to the present disclosure, the outer diameter $d_S$ of shaft 12 is sized to fit within an inner diameter of a coupler (seen in FIG. 2) that interfaces with a valve being locked out by LOTO device 10.

The first ferrule 14 (also referred to as a "front" ferrule") is disposed on shaft 12 near a terminal end T of shaft 12. The second ferrule 16 (also referred to as a "back" ferrule) is also disposed on shaft 12 proximate the first ferrule 14. Both the first and second ferrules 14, 16 are constructed of a metal or metal alloy, but in some embodiments, can be constructed of a plastic material. In use, ferrules 14, 16 are configured to seal the coupler to which it attaches such that air or other fluid are prevented from escaping the valve. Additionally, ferrules 14, 16 function as retainers to keep the tubing nut 18 from sliding off the shaft 12.

In this embodiment, the first and second ferrules 14, 16 are illustrated as being independent components. However, those of ordinary skill in the art should appreciate that the present disclosure is not so limited. For example, in some embodiments, the first and second ferrules 14, 16 are constructed as a unitary piece. In other embodiments, seen later in more detail, LOTO device 10 does not include one or both of the first and second ferrules. In these embodiments, the shaft 12 may be formed using a swedging process that alters the diameter of shaft 12.

The tubing nut 18 has a threaded interior that fits onto, and mates with, a threaded exterior of the coupler. Made of a metal or metal alloy, tubing nut 18 threadingly connects LOTO device 10 to the coupler thereby forcing the first ferrule 14 into pressing engagement with the coupler, and forcing the second ferrule 16 into pressing engagement with the back portion of the first ferrule 14. The cap 20 in this embodiment is a cylinder made of a metal or metal alloy, and has an inner diameter $d_C$ that is larger than the outer diameter $d_N$ of the tubing nut 18. When LOTO device 10 is installed, cap 20 is disposed over the tubing nut 18. Because the inner diameter $d_C$ of cap 20 is larger than the outer diameter $d_N$ of the tubing nut 18, cap 20 rotates freely over tubing nut 18. This free rotation prevents a person from being able to loosen the tubing nut 18 from the coupler and subsequently removing the LOTO device 10.

Locking lever 22 comprises an elongated member pivotably connected at or near one end of the shaft 12. In this embodiment, locking lever 22 pivots between a locked position in which the LOTO device 10 cannot be removed from the coupler, and an unlocked position in which the LOTO device 10 can be removed from the coupler. Locking lever 22 includes a pair of sidewalls 26a, 26b forming a channel 24 therebetween. The channel 24 extends the length of the locking lever 22 and is sized to receive a shaft 12 when LOTO device 10 is in the locked position. A lock receiving section 28 is proximate one end of the channel 24, and comprises a pair of through holes 30 offset from the channel 24. The through holes 30 are configured to receive the shackle of a lock.

Figure 2:
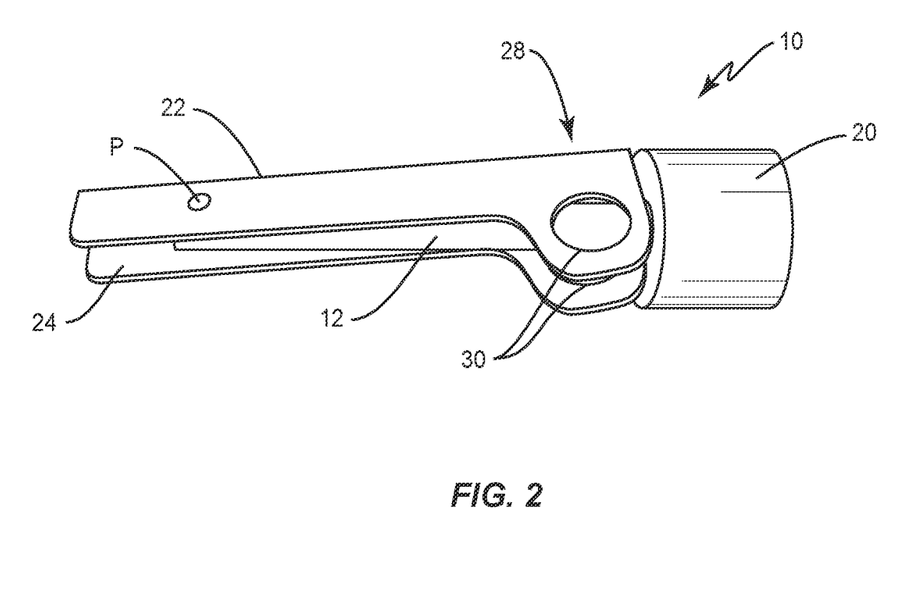
FIG. 2 illustrates the LOTO device configured according to one embodiment of the present disclosure in a locked position.

FIG. 1 illustrates LOTO device 10 in the unlocked position. In the unlocked position, LOTO device 10 can be freely removed from the coupler interfacing the valve so that a maintenance worker or other operator can perform the functions necessary to reintroduce the valve back into service. FIG. 2, however, illustrates LTO device 10 in the locked position. In this position, cap 20 is disposed over the tubing nut 18 so that tubing nut 18 cannot be inadvertently or purposely loosened from the coupler. Additionally, locking lever 22 is rotated over shaft 12 such that shaft 12 is received by channel 24. According to the present embodiments, and as seen in more detail later, the shackle of a lock (e.g., a pad lock) extends through throughholes 30 when the locking lever 22 pivots to the locked position. Once the lock is locked, the shackle maintains locking lever 22 in the locked position. Because the locking lever 22 is maintained in its locked position, the cap 20 is prevented from moving away from the tubing nut 18, and thus, is forced to remain over top of tubing nut 18. In this position, cap 20 therefore prevents the removal of tubing nut 18.

Figure 3:
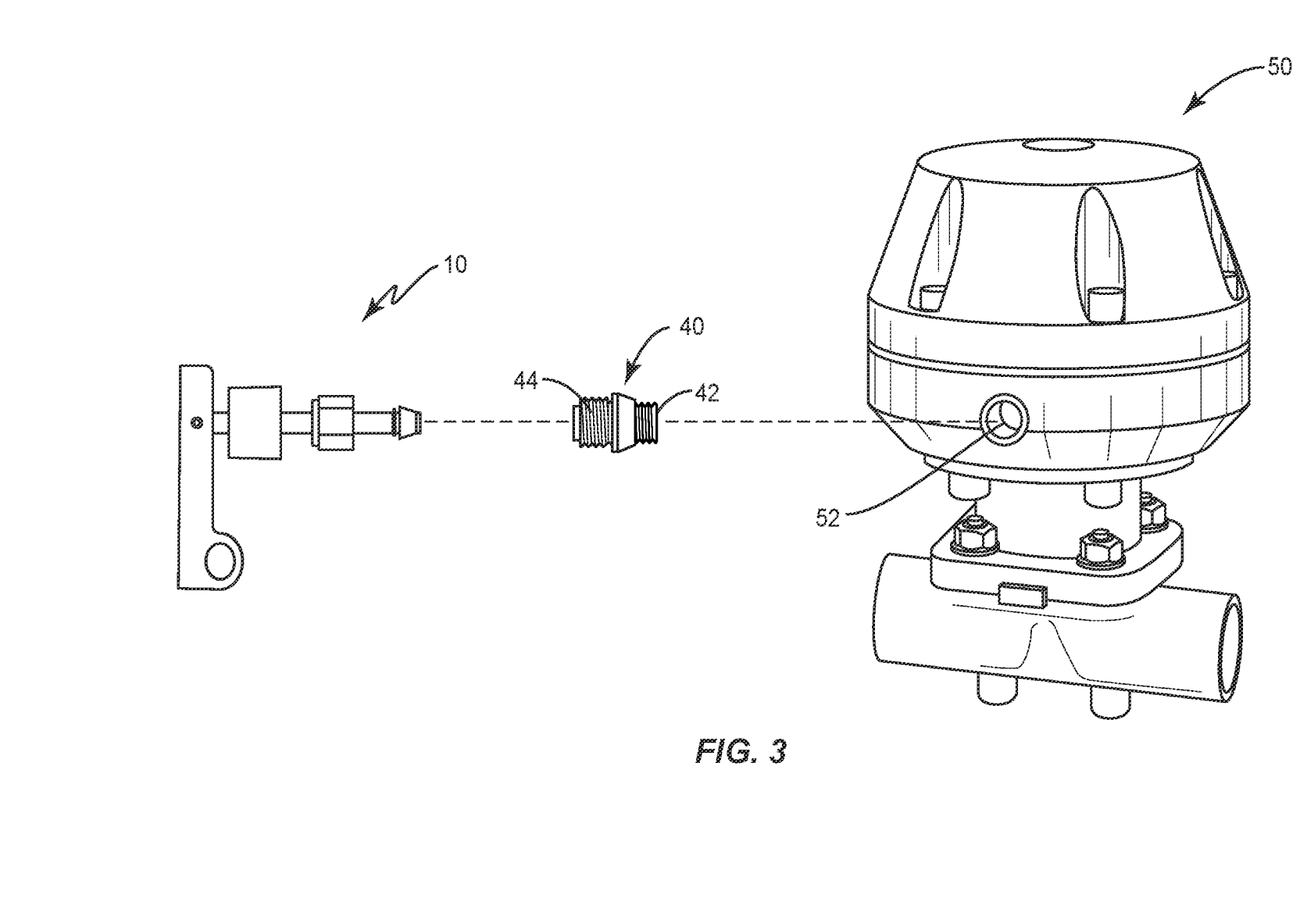
FIG. 3 illustrates how a LOTO device configured according to the present disclosure connects to an air actuated valve in one embodiment.

FIG. 3 illustrates how LOTO device 10 connects to an air actuated valve 50 according to one embodiment. When in operation, an air line (seen later in FIGS. 4A-4B) connects to an inlet port 52 on valve 50 and provides the high pressure air stream that causes valve 50 to open and close. When the valve is removed from service (e.g., for maintenance), the air line is disconnected from the port and replaced with a coupler 40. The coupler has a first threaded end 42 that threadingly engages the port 52, and an opposing second end 44 that will threadingly engage the tubing nut 18 on the LOTO device 10. In some cases, a coupler 40 may already be installed on valve 50. In these situations, the air line might also connect to port 52 via coupler 40.

To lock the valve 50, a user first inserts the terminal end T of shaft 12 into the second end 44 of coupler 40. The user then slides the tubing nut 18 axially along shaft 12 and threads tubing nut 18 onto the coupler 40. The user next slides cap 20 down shaft 12 into position over the tubing nut 18. As previously described, the inner diameter $d_C$ of cap 20 is larger than the outer diameter $d_N$ of tubing nut 18. This size differential helps prevent someone from rotating the tubing nut 18 when cap 20 is in place and the device is locked. The user then rotates the locking lever 22 towards the cap 20 and onto shaft 12.

Once LOTO device 10 is in the locked position, the user inserts the shackle of a lock or other such device into the pair of through holes 30 formed in lock receiving section 28 and secures the lock. So positioned, the locking lever 22 is prevented from pivoting away from shaft 12, and the end of the locking lever 22 is maintained proximate a top surface cap 20. This keeps cap 20 in position over tubing nut 18 so that tubing nut 18 cannot be loosened until the LOTO device 10 is unlocked.

Figure 4A:
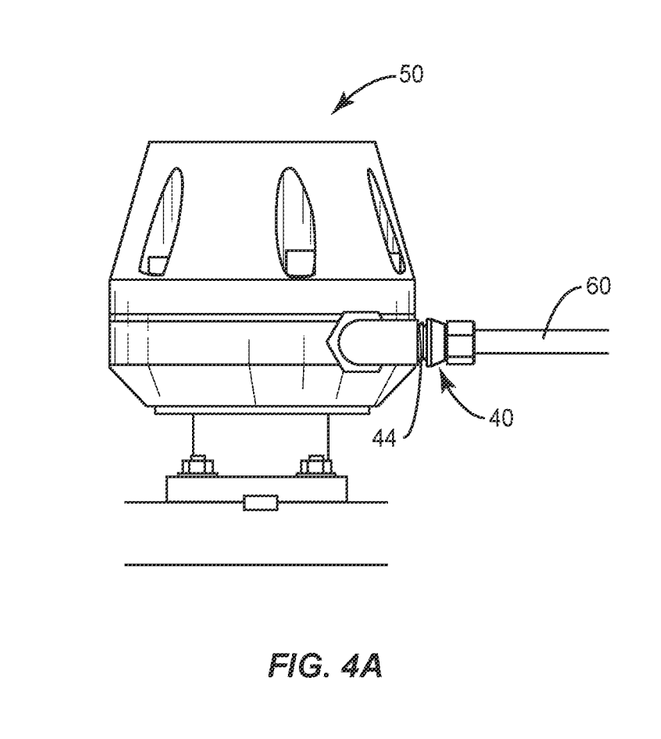
FIGS. 4A-4G illustrate a method for connecting a LOTO device configured according to the present disclosure to a valve thereby locking the valve according to one embodiment.
Figure 4B:
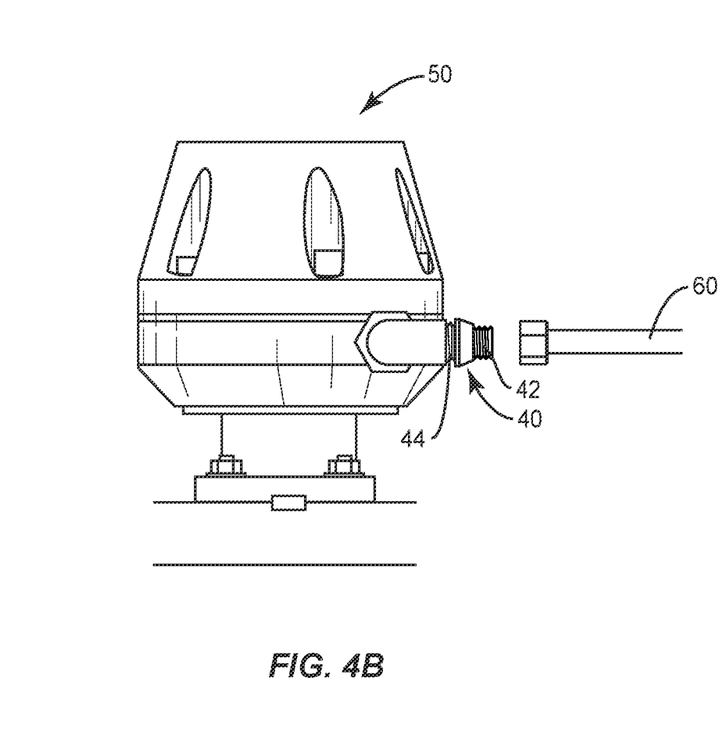
Figure 4C:
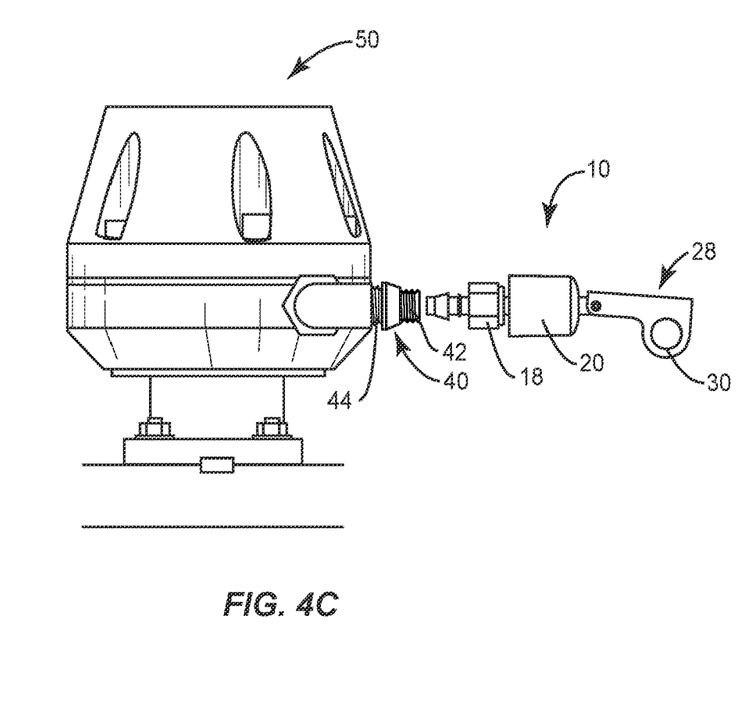

FIGS. 4A-4G illustrate how a LOTO device 10 configured according to the present embodiments is connected to an air actuated valve 50 thereby locking valve 50 and preventing valve 50 from being inadvertently re-introduced to service. Particularly, as seen in FIG. 4A, valve 50 is illustrated as being in-service, and thus, has an air line 60 attached via coupler 40. As a first step, the air line 60 is removed from coupler 40 (FIG. 4B). This isolates valve 50. The shaft 12 of LOTO device 10, along with the first ferrule 14, is then inserted into port 44 of coupler 40 (FIG. 4C). The tubing nut 18 is then threaded onto port 44 (FIG. 4D) thereby connecting LOTO device 10 to valve 50.

Figure 4D:
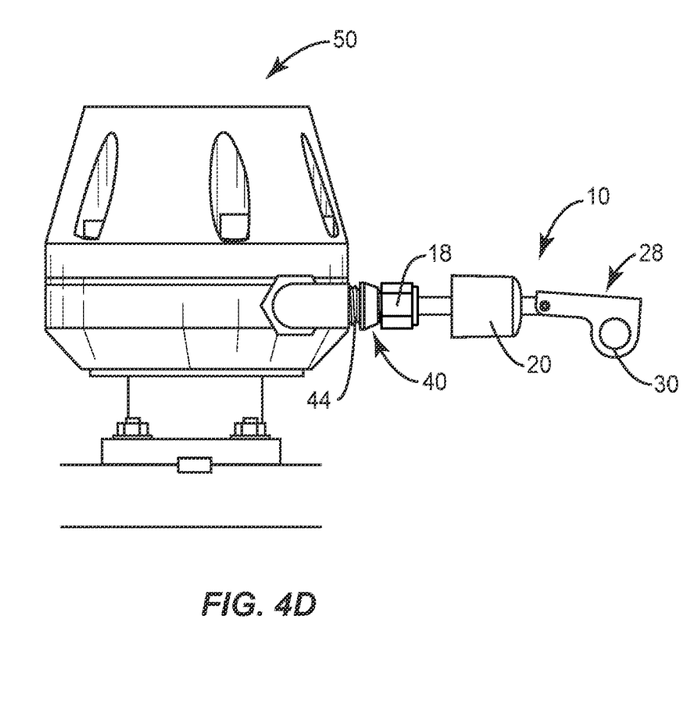
Figure 4E:
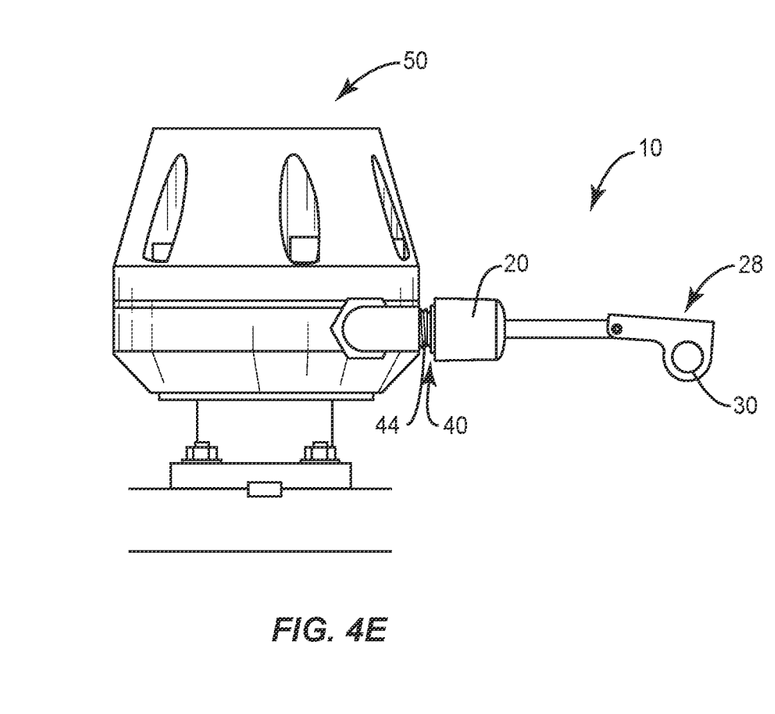
Figure 4F:
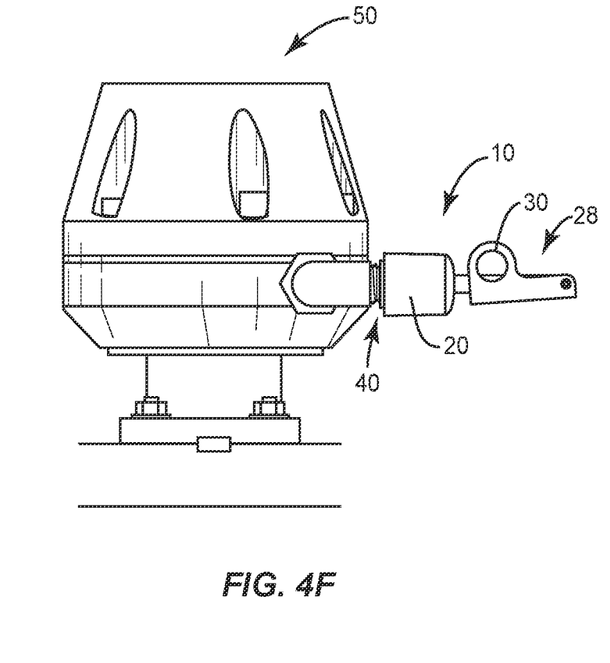
Figure 4G:
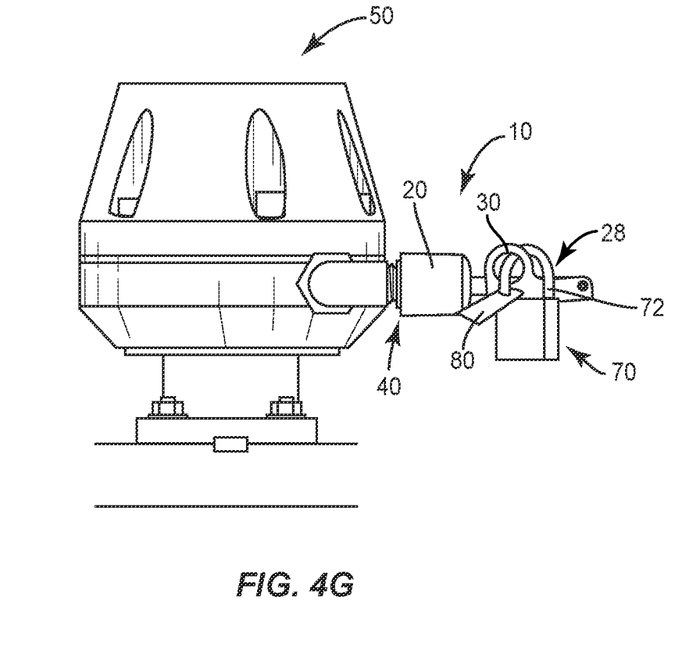

The maintenance worker or other operator then moves cap 20 along shaft 12 until cap 20 is positioned over tubing nut 18 (FIG. 4D). As stated previously, the inner diameter $d_C$ of cap 20 is larger than the outer diameter $d_N$ of the tubing nut 18. Thus, cap 20 rotates freely over tubing nut 18 thereby preventing the tubing nut 18 from being loosened from coupler 40. Once cap 20 is in position, the locking lever 22 is rotated such that the channel 24 receives shaft 12 (FIG. 4F). The shackle 72 of a lock 70 is then passed through the through holes 30 in the lock receiving section 28 and the lock 70 is locked (FIG. 4G). So secured, the locking lever 22 cannot be rotated away from shaft 12 until the lock 70 is unlocked. Similarly, the lock receiving section 28 is maintained in its position proximate cap 20 such that cap 20 is prevented from sliding back along shaft 12 and exposing the tubing nut 18. Moreover, as an additional visual cue, the person installing the LOTO device 10 may also attach a warning tag 80 to the lock indicating that the valve cannot be put back into service. In accordance with existing OSHA rules, the tag contains the name of the person who installed the LOTO device 10 to lock valve 50 along with the words "DO NOT OPERATE" or similar wording or pictograph.

Figure 5A:
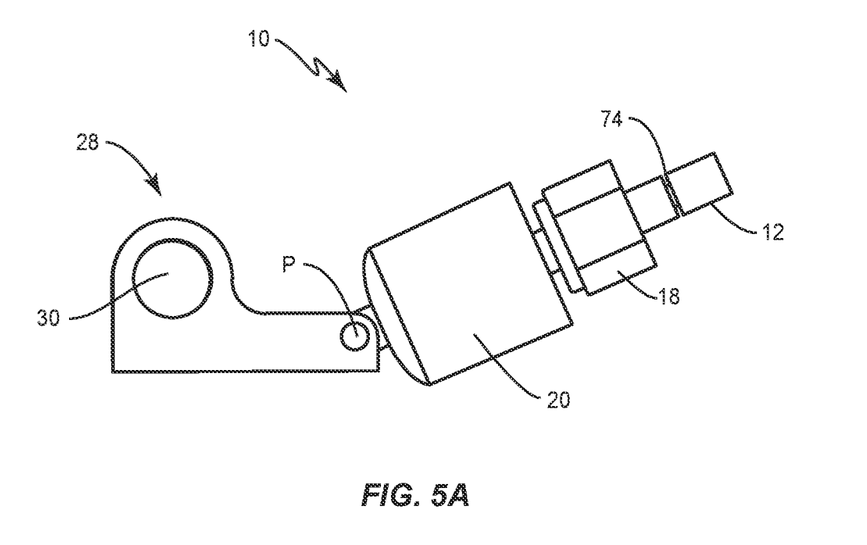
FIGS. 5A-5B illustrate a Lockout Tagout (LOTO) device configured according to another embodiment of the present disclosure.
Figure 5B:
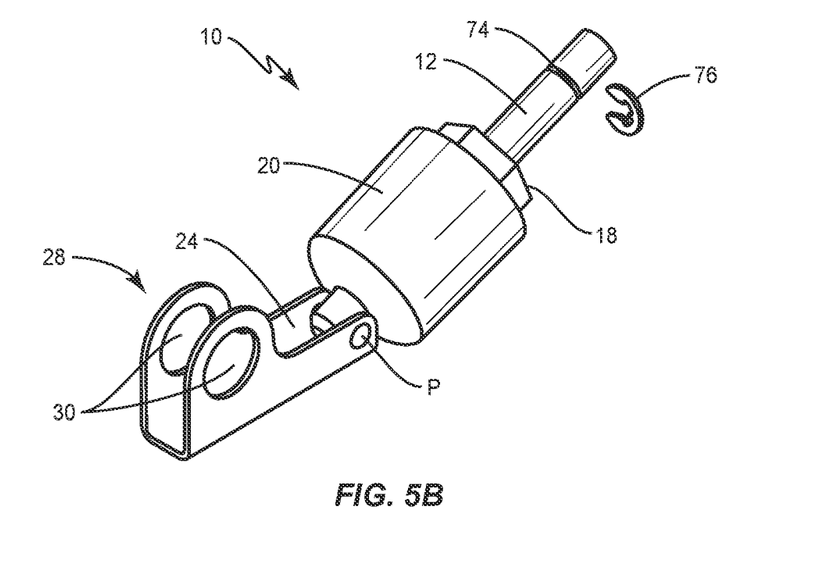

The LOTO device 10 described in the previous embodiments includes ferrules 14, 16. As stated above, one or both of these ferrules 14, 16, when installed, help seals the connection between the shaft 12 and port 44 of coupler 40, and prevents the tubing nut 18 from being removed from the shaft 12. However, those of ordinary skill in the art should readily appreciate that this is for illustrative purposes only, and that the present embodiments are not limited to the use of one or both of the ferrules 14, 16. In at least one embodiment, seen in FIGS. 5A-5B, for example, LOTO device 10 does not include ferrules 14, 16. Instead, ferrules 14, 16 are replaced by an e-ring 76 that fits into an annular groove 74 formed in shaft 12 proximate a terminal end of shaft 12. E-ring 76 also functions as a retainer that prevents the tubing nut 18 from sliding down and/or being removed from an end of shaft 12.

Figure 6A:
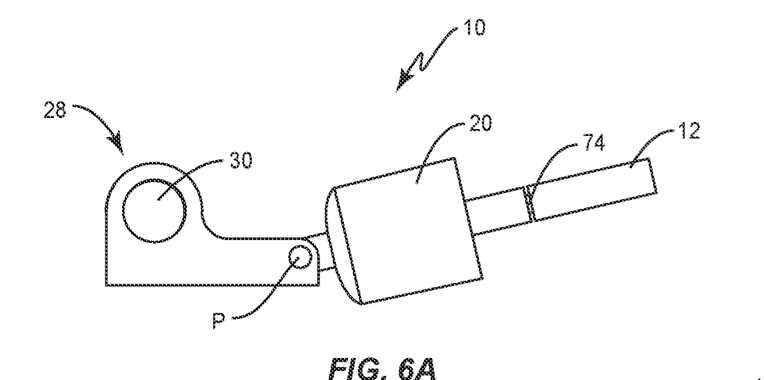
FIGS. 6A-6B illustrate a Lockout Tagout (LOTO) device configured according to another embodiment of the present disclosure.
Figure 6B:
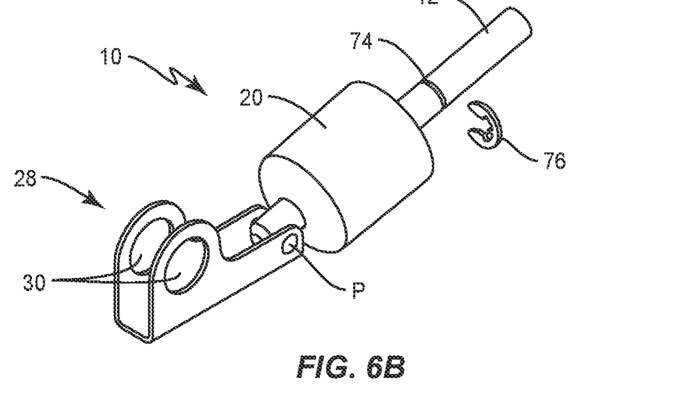
Figure 6C:
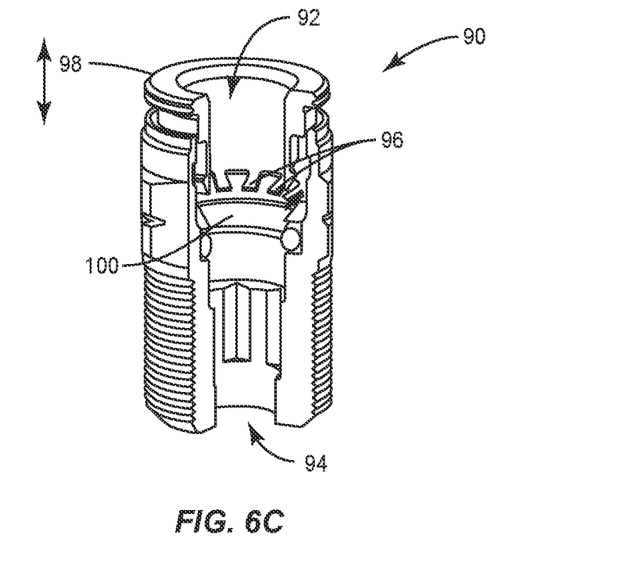
FIG. 6C illustrates a fitting into which a Lockout Tagout (LOTO) device configured according to the embodiment of FIGS. 6A-6B is inserted.

In another embodiment, the LOTO device 10 does not include the fastener 18. For example, as seen in FIGS. 6A-6C, shaft 12 is configured such that it connects LOTO device 10 to valve 50 via a "push-to-connect" type fitting 90 operatively connected to valve 50. The annular groove 74 is disposed on shaft 12 such that it generally bisects a length of shaft 12, however, other positions along shaft 12 for annular groove 74 are also possible. Similarly to the previous embodiment, e-ring 76 fits into annular groove 74. Additionally, it is assumed that the air line 60 has been removed from coupler 40 thereby isolating valve 50 from the system.

As seen in FIG. 6C, fitting 90 comprises a first open end 92 and an opposing second open end 94 that operatively connects to valve 50. That is, in one embodiment, the second open end 94 of fitting 90 is configured to releasably connect to coupler 40. In other embodiments, the second open end 94 of fitting 90 is configured to releasably connect to valve 50. Regardless of the particular connection, however, the first open end 92 of fitting 90 is configured to receive shaft 12 thereby releasably coupling LOTO device 10, directly or indirectly, to valve 50.

In more detail, fitting 90 comprises a release flange 98 through which the shaft 12 of LOTO device 10 is inserted. Once shaft 12 is inserted into fitting 90 through the first opening 92, a plurality of locking elements 96 grip shaft 12 and prevent it from being withdrawn from fitting 90. A seal member 100 contacts the exterior sidewall of shaft 12 thereby forming a seal between shaft 12 and fitting 90. The cap 20 is then placed over the connection between shaft 12 and fitting 90 so that it covers the release flange 98. As in the previous embodiment, the inner diameter $d_C$ of cap 20 is larger than the outer diameter of fitting 90. Thus, cap 20 rotates freely over fitting 90 thereby preventing a user from depressing the release flange 98. This prevents the inadvertent release of shaft 12 from fitting 90.

Once cap 20 is in position, locking lever 22 is rotated such that the channel 24 receives shaft 12. The shackle 72 of lock 70 is then passed through the through holes 30 in the lock receiving section 28 and the lock 70 is locked. So secured, the locking lever 22 cannot be rotated away from shaft 12 until the lock 70 is unlocked. Similarly, the lock receiving section 28 is maintained in its position proximate cap 20 such that cap 20 is prevented from sliding back along shaft 12 and exposing the release flange 98. Additionally, as in the previous embodiments, a warning tag 80 may also be attached to the lock indicating that the valve 50 cannot be put back into service. In accordance with existing OSHA rules, the tag 80 contains the name of the person who installed the LOTO device 10 to lock valve 50 along with the words "DO NOT OPERATE" or similar wording or pictograph.

To release shaft 12 from the fitting 90, a user first removes lock 70 from the lock receiving section 28. So removed, the user is then able to rotate the locking lever 22 away from shaft 12 and retract cap 20 back along shaft 12 to expose the release flange 98. The user then depresses the release flange 98 thereby causing the plurality of locking elements 96 to release the grip on shaft 12 so that the user can retract shaft 12 from fitting 90 and remove LOTO device 10 from valve 50.

The present invention may, of course, be carried out in other ways than those specifically set forth herein without departing from essential characteristics of the invention. For example, the LOTO device 10 of the present embodiments may also be used to lock out valves other than those that are air actuated. The present embodiments are to be considered in all respects as illustrative and not restrictive, and all changes coming within the meaning and equivalency range of the appended claims are intended to be embraced therein.

What is claimed is:

1. A method of locking out a valve, the method comprising:
   connecting a shaft of a Lockout Tagout (LOTO) device to a coupler attached to the valve;
   sliding a cap over a connection between the shaft and the coupler so as to prevent the shaft from being loosened from the coupler, wherein the cap is slidingly engaged with the shaft; and
   pivoting a locking lever pivotably connected to the shaft of the LOTO device from an unlocked position in which the LOTO device can be removed from the coupler, to a locked position that prevents the cap from sliding along the shaft and exposing the connection between the shaft and the coupler thereby preventing the removal of the LOTO device from the coupler.

2. The method of claim 1 wherein connecting the shaft of the LOTO device to the coupler comprises connecting a fastener of the LOTO device to the coupler, wherein the fastener is configured to slide over the shaft.

3. The method of claim 2 wherein sliding the cap over the connection between the shaft and the coupler comprises sliding the cap over the fastener so as to prevent the fastener from being loosened from the coupler, wherein the cap has an inner diameter that is larger than an outer diameter of the fastener.

4. The method of claim 3 wherein in the locked position, the locking lever prevents the cap from sliding along the shaft and exposing the fastener thereby preventing the removal of the LOTO device from the coupler.

5. The method of claim 2 wherein connecting the fastener of the LOTO device to the coupler comprises:
   inserting the shaft into a port of the coupler attached to the valve;
   sliding the fastener over the shaft towards the coupler; and
   connecting the fastener to the coupler, thereby connecting the shaft to the coupler.

6. The method of claim 2 wherein connecting the fastener of the LOTO device to the coupler comprises connecting the shaft to a push-to-connect fitting operatively connected to the coupler.

7. The method of claim 1 wherein rotating pivoting the locking lever to the locked position comprises pivoting the locking lever relative to the shaft such that the shaft is received in a channel formed by the locking lever.

8. The method of claim 7 further comprising:
   inserting a shackle of a lock through first and second opposing through holes of a lock receiving section integrally formed in the locking lever; and
   locking the lock.

9. The method of claim 8 further comprising:
   unlocking the lock and removing the shackle from the first and second through holes of the lock receiving section; and
   pivoting the locking lever from the locked position to the unlocked position thereby allowing the cap to slide along the shaft and expose a fastener, thereby allowing the removal of the LOTO device from the coupler.

10. A Lockout Tagout (LOTO) device for a valve, the LOTO device comprising:
    a shaft configured to be connected to a coupler attached to a valve;
    a cap slidingly engaged with the shaft, and configured to slide over the shaft so as to prevent the shaft from being loosened from the coupler; and
    a locking lever connected to the shaft at a pivot point to pivot between an unlocked position in which the LOTO device can be removed from the coupler, and a locked position that prevents the removal of the LOTO device from the coupler, wherein in the locked position, the locking lever is configured to prevent the cap from sliding along the shaft.

11. The LOTO device of claim 10 further comprising a fastener configured to connect the shaft to the coupler, and wherein:
    the cap is configured to slide over the fastener so as to prevent the fastener from being loosened from the coupler; and
    the locking lever, when in the locked position, is configured to prevent the cap from sliding along the shaft and exposing the fastener.

12. The LOTO device of claim 11 further comprising a retainer disposed on the shaft and configured to prevent the fastener from sliding off of the shaft.

13. The LOTO device of claim 12 wherein the retainer comprises:
    a first ferrule disposed proximate a terminal end of the shaft, and configured to pressingly engage the coupler when the fastener connects the shaft to the coupler; and
    a second ferrule disposed between the fastener and the first ferrule, and configured to pressingly engage the first ferrule when the fastener connects the shaft to the coupler.

14. The LOTO device of claim 13 wherein the first ferrule is tapered.

15. The LOTO device of claim 12 further comprising a groove formed in the shaft, and wherein the retainer is configured to fit into the groove.

16. The LOTO device of claim 11 wherein the cap has an inner diameter that is larger than an outer diameter of the fastener, and is configured to rotate freely over the fastener when the fastener connects the shaft to the coupler.

17. The LOTO device of claim 10 wherein the shaft is configured to connect to a push-to-connect fitting operatively connected to the valve.

18. The LOTO device of claim 10 wherein the locking lever comprises an elongated member pivotably attached to the shaft at one end of the shaft.

19. The LOTO device of claim 10 wherein the locking lever comprises first and second opposing sidewalls forming an elongated channel therebetween that is configured to receive the shaft when the locking lever is in the locked position.

20. The LOTO device of claim 19 wherein the locking lever further comprises a lock receiving section configured to receive a lock that maintains the locking lever in the locked position.

21. The LOTO device of claim 20 wherein the lock receiving section comprises first and second opposing through holes offset from the channel, and are formed in the first and second opposing sidewalls, respectively.

22. The LOTO device of claim 21 wherein the first and second opposing through holes are configured to receive a shackle of the lock.

23. The LOTO device of claim 10 wherein the fastener is a tubing nut.

24. The LOTO device of claim 10 wherein the valve is an air-actuated valve.

* * * * *